United States Patent
Moulds

(10) Patent No.: US 12,550,884 B2
(45) Date of Patent: Feb. 17, 2026

(54) RETRACTABLE ANCHOR FOR A DECOY

(71) Applicant: Quinten Moulds, Thief River Falls, MN (US)

(72) Inventor: Quinten Moulds, Thief River Falls, MN (US)

(*) Notice: Subject to any disclaimer, the term of this patent is extended or adjusted under 35 U.S.C. 154(b) by 0 days.

(21) Appl. No.: 18/191,462

(22) Filed: Mar. 28, 2023

(65) Prior Publication Data

US 2024/0324586 A1  Oct. 3, 2024

(51) Int. Cl.
*A01M 31/06* (2006.01)
*B65H 75/44* (2006.01)
*B65H 75/48* (2006.01)

(52) U.S. Cl.
CPC ......... *A01M 31/06* (2013.01); *B65H 75/4431* (2013.01); *B65H 75/486* (2013.01)

(58) Field of Classification Search
CPC ........................... A01M 31/06; B65H 75/4431
See application file for complete search history.

(56) References Cited

U.S. PATENT DOCUMENTS

| | | | | |
|---|---|---|---|---|
| 4,056,890 | A  * | 11/1977 | Dembski | A01M 31/06 43/3 |
| 8,584,395 | B2 * | 11/2013 | Tonkovich | A01M 31/06 43/2 |
| 2008/0155879 | A1* | 7/2008 | Whipple | A01M 31/06 43/3 |
| 2009/0039191 | A1* | 2/2009 | Yen | B65H 75/4431 242/378.2 |
| 2015/0059229 | A1* | 3/2015 | Miller | A01M 31/06 43/3 |
| 2015/0246788 | A1* | 9/2015 | Nien | B65H 75/4431 242/376 |
| 2019/0075784 | A1* | 3/2019 | Anderson | A01M 31/06 |
| 2019/0174869 | A1* | 6/2019 | Wang | B65H 75/26 |
| 2020/0323196 | A1* | 10/2020 | Clark | B65H 75/4431 |

* cited by examiner

*Primary Examiner* — Richard G Davis
(74) *Attorney, Agent, or Firm* — Fargo Patent & Business Law; Thomas Kading

(57) ABSTRACT

A retractable anchor assembly according to one disclosed non-limiting embodiment of the present disclosure includes a spool base; a spool mounted for rotation around an axis and at least partially within the spool base; a line attached to the spool; a clock spring mounted to the spool base and the spool to rotationally bias the spool around the axis to automatically retract the line; a button that interfaces with the spool to selectively prevent rotation of the spool; and a spring along the axis to bias the button into engagement with the spool.

13 Claims, 4 Drawing Sheets

RETRACTABLE ANCHOR FOR A DECOY

BACKGROUND

The present disclosure relates to a hunting decoy, and more particularly to a retractable anchor for the decoy.

The concept of using water fowl decoys to attract game to a particular hunting area is well known in the hunting art. Oftentimes, each decoy is rigged with a sinking line that may be used to attach to a main line. Such lines are often five or six feet long. A 5 to 6 foot tangle-free cord is sufficient for most hunting locations and provides enough slack so the floating decoys can move naturally in current and on windy days. One issue is decoy string lengths must vary according to water depth. The strings are often cut and tied at the longest length of working depth. Such numerous lines, however, are cumbersome and often tangle thereby complicating repositioning and collection of the decoys for transport.

SUMMARY

A decoy assembly according to one disclosed non-limiting embodiment of the present disclosure includes a decoy; and a retractable anchor assembly mounted to the decoy, the retractable anchor assembly comprising a spool rotatable about an axis to retract a line.

A further embodiment of any of the foregoing embodiments of the present disclosure includes that the decoy is representative of a duck.

A further embodiment of any of the foregoing embodiments of the present disclosure includes that the spool is spring loaded by a clock spring.

A further embodiment of any of the foregoing embodiments of the present disclosure includes that a button that interfaces with the spool.

A further embodiment of any of the foregoing embodiments of the present disclosure includes that the button comprises a polygonal surface that interfaces with a polygonal recess in the spool to selectively prevent rotation of the spool.

A further embodiment of any of the foregoing embodiments of the present disclosure includes that the polygonal surface is a square.

A further embodiment of any of the foregoing embodiments of the present disclosure includes that the button is spring loaded along the axis.

A further embodiment of any of the foregoing embodiments of the present disclosure includes that the line is 5-6 feet in length.

A further embodiment of any of the foregoing embodiments of the present disclosure includes that an anchor attached to the line.

A further embodiment of any of the foregoing embodiments of the present disclosure includes that a clip attached to the line.

A retractable anchor assembly according to one disclosed non-limiting embodiment of the present disclosure includes a spool base; a spool mounted for rotation around an axis and at least partially within the spool base; a line attached to the spool; a clock spring mounted to the spool base and the spool to rotationally bias the spool around the axis to automatically retract the line; a button that interfaces with the spool to selectively prevent rotation of the spool; and a spring along the axis to bias the button into engagement with the spool.

A further embodiment of any of the foregoing embodiments of the present disclosure includes that the button comprises a polygonal surface that interfaces with a polygonal recess in the spool to selectively prevent rotation of the spool.

A further embodiment of any of the foregoing embodiments of the present disclosure includes that the polygonal surface is a square.

A further embodiment of any of the foregoing embodiments of the present disclosure includes that the line is 5-6 feet in length.

A further embodiment of any of the foregoing embodiments of the present disclosure includes an anchor attached to the line.

A further embodiment of any of the foregoing embodiments of the present disclosure includes a clip attached to the line.

A further embodiment of any of the foregoing embodiments of the present disclosure includes that the spool base is attachable to a decoy.

The foregoing features and elements may be combined in various combinations without exclusivity, unless expressly indicated otherwise. These features and elements as well as the operation thereof will become more apparent in light of the following description and the accompanying drawings. It should be appreciated that however the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
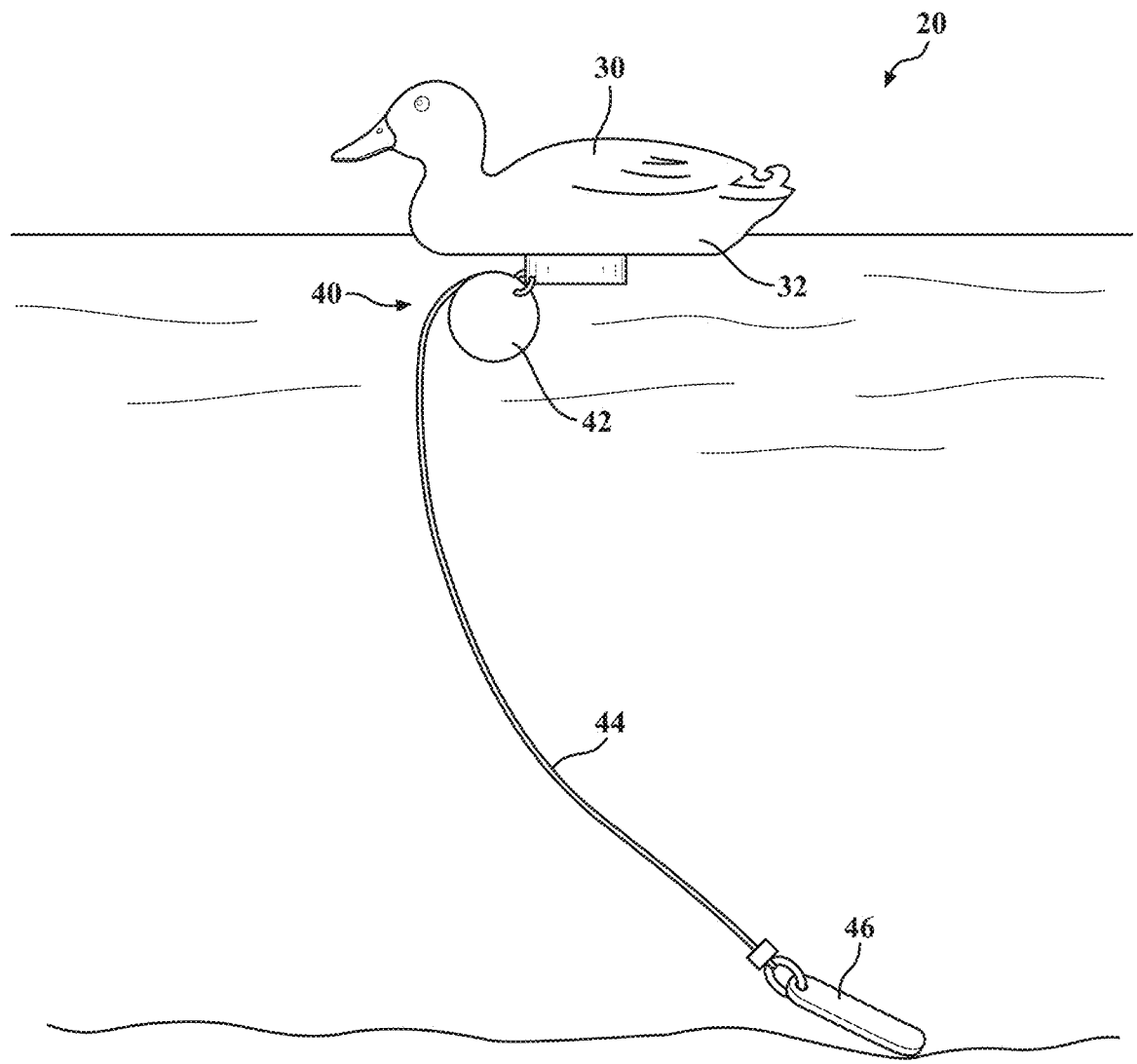
FIG. 1 is a perspective view of a decoy assembly according to one disclosed non-limiting embodiment.

FIG. 1 schematically illustrates a decoy assembly 20 that includes a decoy 30 and a retractable anchor assembly 40 attached thereto. The decoy 30 may be used to attract water-fowl, which may take the form of ducks or geese. They may, however, have other forms suitable to the nature of the game to be attracted.

Figure 2:
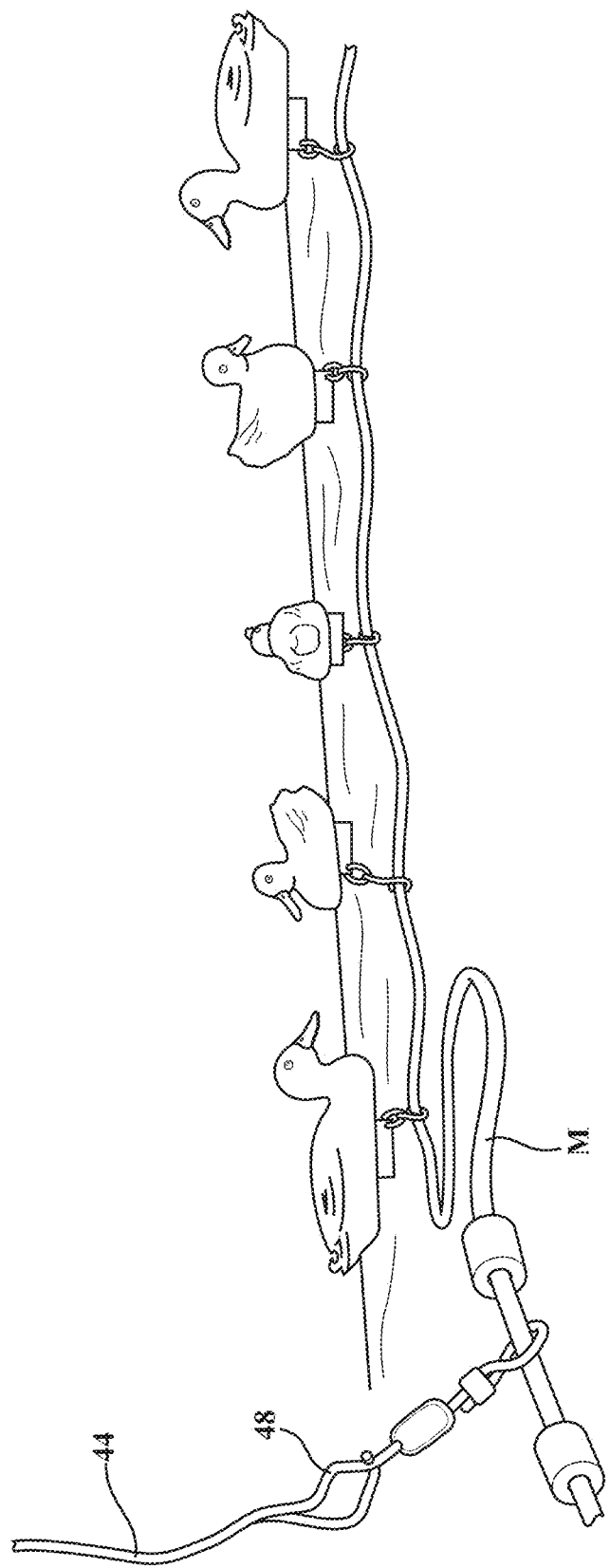
FIG. 2 is a perspective view of a decoy assembly according to another disclosed non-limiting embodiment.

The retractable anchor assembly 40 may be attached to a bottom 32 of the decoy 30. The retractable anchor assembly 40 generally includes a spool assembly 42, a line 44, and an anchor 46. In one embodiment, the anchor 46 may be a weight such as a mushroom anchor. In another embodiment, the anchor 46 may be a clip 48 or other attachment to attach the line 44 to another line such as a main line (FIG. 2).

The spool assembly 42 may be affixed to the bottom 32 of the decoy 30 via screws, adhesive, etc. In one embodiment, the spool base 50 may be affixed to the decoy via a swivel, snap link, or other interface to connect to ballast of decoy 30. In another embodiment, the spool assembly 42 may be integrated into the body of the decoy 30.

Figure 3:
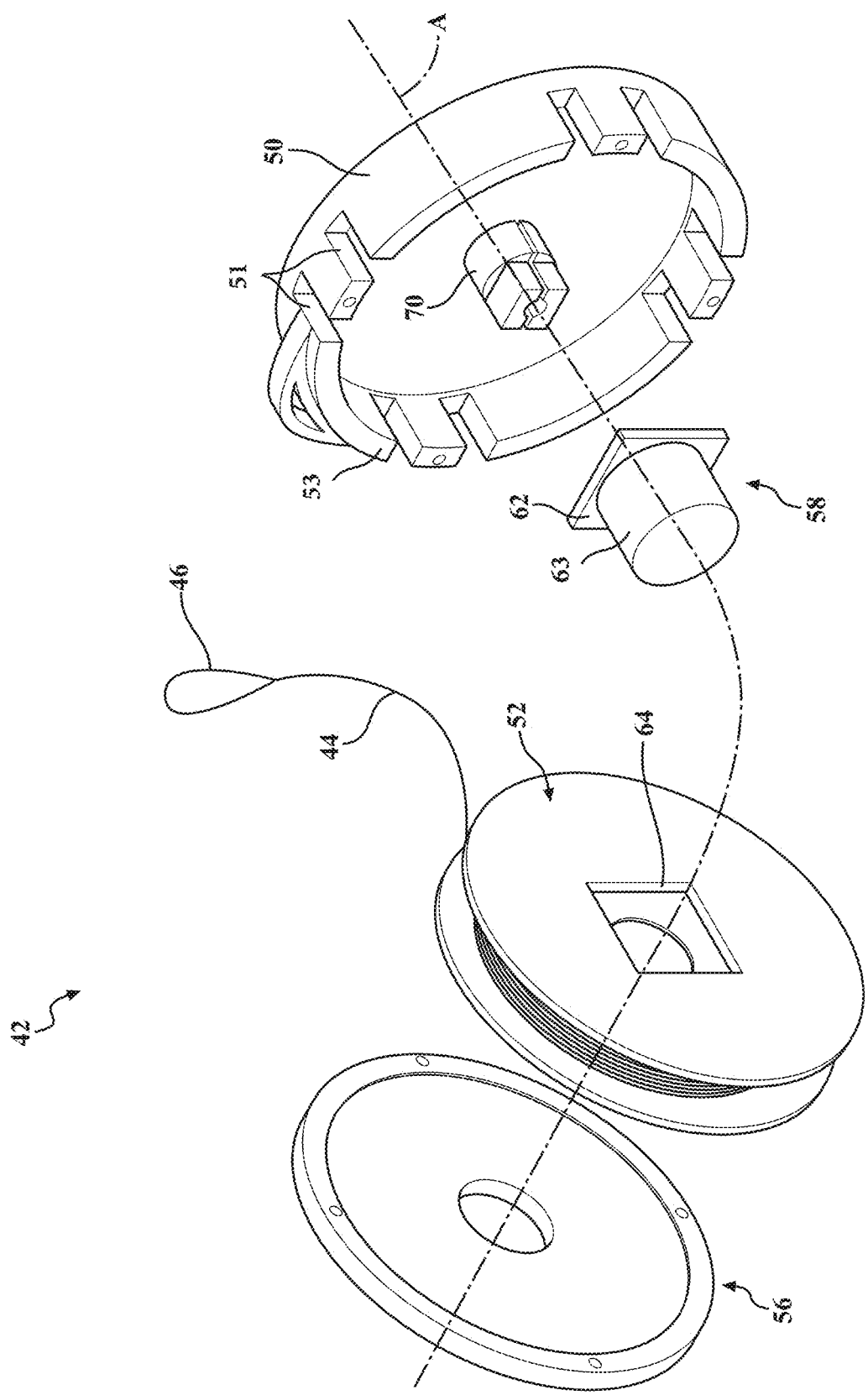
FIG. 3 is an exploded view of a retractable anchor assembly for the decoy according to another disclosed non-limiting embodiment.
Figure 4:
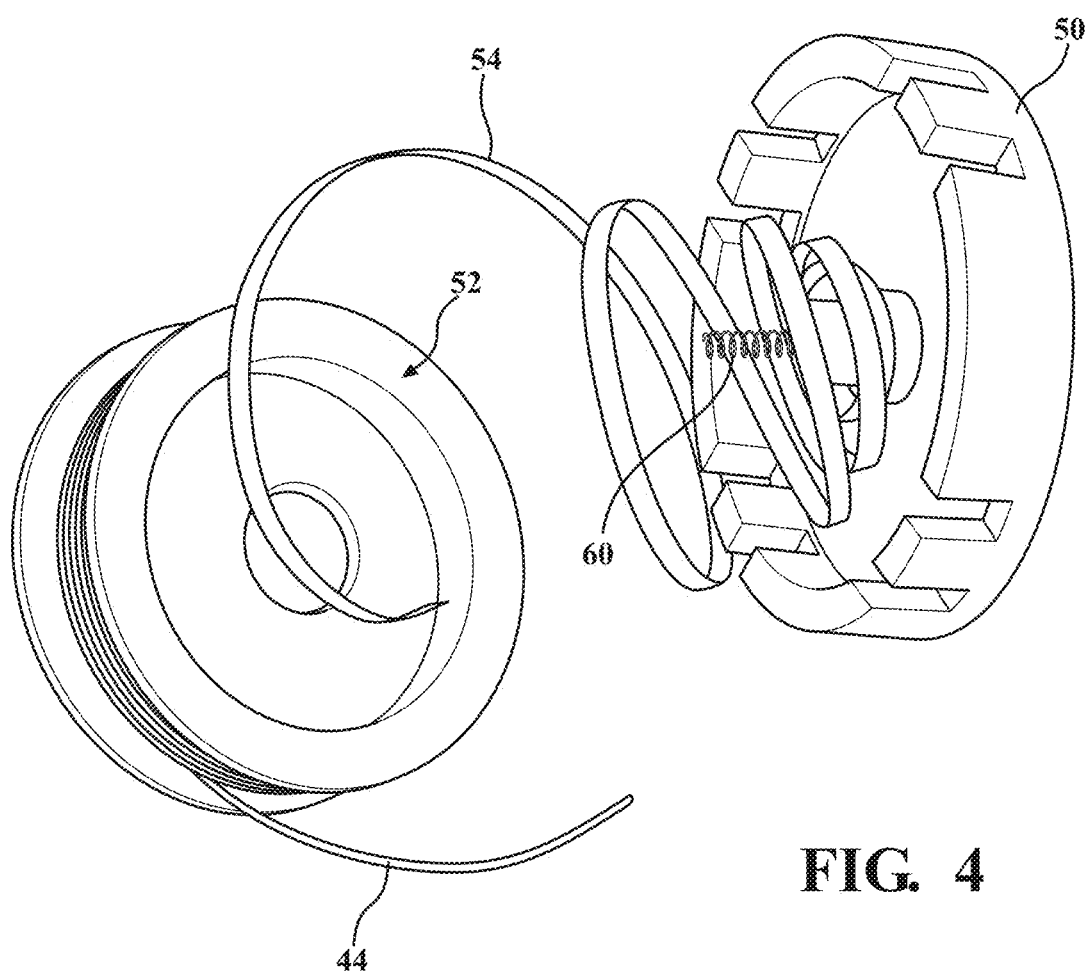
FIG. 4 is a perspective view of the retractable anchor assembly of FIG. 3.

With reference to FIG. 3 and FIG. 4, the spool assembly 42 generally includes a spool base 50, a spool 52 that is rotatable about an axis A, a spring 54, a spool lid 56, a retraction button 58 and a button spring 60 along axis A. The spool base 50, the spool 52, the spool lid 56, and the retraction button 58 may be additively manufactured, molded or otherwise formed. The additive manufacturing process fabricates or "grows" components using three-dimensional information, for example a three-dimensional computer model. The three-dimensional information is converted into a plurality of slices, each slice defining a cross section of the component for a predetermined height of the slice.

The spool base 50 is a rotationally fixed component and that which is fixed to the decoy 30. The spool base 50 may include apertures 51 to permit water to escape and for the internals to be lubricated. In one embodiment, the apertures 51 are slots that extend through an edge 53 of the spool base 50. The lid 56 is mounted to the spool base 50 to protect the spool 52, the line 44 and the spring 54.

The line 44 is mounted to the spool 52 and is coiled therearound for storage. The spool 52 is rotationally spring biased by the spring 54 to automatically retract the line 44 in response to pressing the retraction button 58. The spring 54 may be a clock spring or other such spring that is mounted to the spool base 50 and the spool 52 to store energy on a rotating axis in response to extension of the line 44 which rotates the spool 52. In one example, the spring 54 may provide enough force to retract a 4-6 oz weight anchor.

The retraction button 58 is spring loaded by the button spring 60 along axis A so that the retraction button 58 operates to rotationally prevent the spool 52 from being rotated by the spring 54. The retraction button 58 may include a polygonal surface 62, for example, a square, that is engaged with a corresponding recess 64 in the spool 52 and a cylindrical surface 63 that extends through the spool 52 and the spool lid 56. That is, the retraction button 58 is in spring biased engagement with the spool 52 under force of the button spring 60 along axis A to prevent rotation of the spool 52. The retraction button 58 may be rotationally fixed with respect to the spool base 50 by a mount 70 which may also be used to fix one end of the spring 54. Although a particular interface is disclosed in the illustrated embodiment, other such ratchet, pawls, cams, and engagement surfaces may be utilized to control rotation of the spool 52.

The spring 54 and the button spring 60 may be manufactured of a stainless steel and/or packed in a waterproof grease. That is, the spool base 50 may contain waterproof grease such that the spring 54, the button spring 60, the spool 52 and the retraction button 58 are essentially waterproofed.

In use, the retraction button 58 is pressed to disengage the polygonal surface 62 from the corresponding recess 64 so that the line 44 may be pulled out. The manual extension of the line 44 rotates the spool 52 to store rotational energy into the spring 54, i.e., coils the spring 54 tighter about axis A. Once the desired line length is achieved, the retraction button 58 is released and the polygonal surface 62 is engaged with a corresponding recess 64 in the spool 52 to prevent retraction of the line 44.

Upon depression of the retraction button 58 to overcome the button spring 60 along axis A, the polygonal surface 62 is disengaged from the corresponding recess 64 such that the spool 52 is rotated by the stored energy of the spring 54 to retract the line 44.

The retractable anchor assembly 40 facilities rapid deployment, repositioning, and collection of the decoys for transport without the heretofore problem of tangles in a decoy bag.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A decoy assembly, comprising:
a decoy;
a retractable anchor assembly mounted to the decoy, the retractable anchor assembly comprising:
a spool rotatable about an axis to retract a line;
a button that interfaces with the spool, the button comprises a polygonal surface that interfaces with a polygonal recess in the spool to selectively prevent rotation of the spool;
a spring along the axis to bias the button into engagement with the spool;
a clock spring mounted to the spool base and the spool to rotationally bias the spool around the axis such that manual extension of the line rotates the spool to store rotational energy into the spring to automatically retract the line in response to disengagement of the polygonal surface that interfaces with a polygonal recess in the spool via movement of the button along the axis; and
a spool lid mounted to a spool base to protect the spool and the spring, the spool base comprises a multiple of slots, wherein the slots extend through an edge of the spool base.

2. The decoy assembly as recited in claim 1, wherein the decoy is representative of a duck.

3. The decoy assembly as recited in claim 2, further comprising an anchor and a clip attached to the line, the line is 5-6 feet in length.

4. The decoy assembly as recited in claim 1, wherein the polygonal surface is a square.

5. The decoy assembly as recited in claim 1, wherein the line is 5-6 feet in length.

6. The decoy assembly as recited in claim 1, further comprising an anchor attached to the line.

7. The decoy assembly as recited in claim 1, further comprising a clip attached to the line.

8. A retractable anchor assembly, comprising:
a spool base, the spool base comprises a multiple of slots that extend through an edge of the spool base;
a spool mounted for rotation around an axis and at least partially within the spool base;
a line attached to the spool;
a clock spring mounted to the spool base and the spool to rotationally bias the spool around the axis;
an anchor attached to the line;
a clip attached to the line;
a spool lid mounted to the edge of the spool base to cover the spool and the spring;
a mount that extends from the spool base, one end of the clock spring engaged with the mount;
a button that interfaces with the mount along the axis such that the button is rotationally fixed with respect to the spool base and movable along the, wherein the button comprises a cylindrical surface that extends through the spool and the spool lid and the button comprises a polygonal surface that interfaces with a polygonal recess in the spool to selectively prevent rotation of the spool; and a spring along the axis to bias the button toward the spool for engagement of the polygonal surface with the polygonal recess to prevent rotation of the spool wherein movement of the button along the axis to overcome the bias results in disengagement of the polygonal surface that interfaces with the polygonal recess in the spool to automatically retract the line under power of the clock spring.

9. The retractable anchor assembly as recited in claim 8, wherein the polygonal surface is a square.

10. The retractable anchor assembly as recited in claim 8, wherein the spool base is attachable to a decoy.

11. The retractable anchor assembly as recited in claim 10, wherein the decoy is representative of a duck.

12. The retractable anchor assembly as recited in claim 8, wherein the spool base, the spool, the spool lid, and the retraction button are additively manufactured.

13. The retractable anchor assembly as recited in claim 11, wherein the polygonal surface of the button is adjacent to the spool base with respect to the cylindrical surface.

* * * * *